United States Patent [19]

Den Dopper

[11] Patent Number: 5,294,036
[45] Date of Patent: Mar. 15, 1994

[54] SOLDERING DEVICE WITH SHIELD OF GAS SUBSTANTIALLY EXCLUDING OXYGEN

[75] Inventor: Rolf A. Den Dopper, Roosendaal, Netherlands

[73] Assignee: Soltec B.V., Oosterhout, Netherlands

[21] Appl. No.: 928,008

[22] Filed: Aug. 12, 1992

[30] Foreign Application Priority Data

Aug. 13, 1991 [NL] Netherlands .................. 9101383

[51] Int. Cl.⁵ .................................................. B23K 1/00
[52] U.S. Cl. ........................................ 228/37; 228/219
[58] Field of Search ............... 228/37, 42, 219, 180.1, 228/260

[56] References Cited

U.S. PATENT DOCUMENTS

| | | | |
|---|---|---|---|
| 3,705,457 | 12/1972 | Tardoskegyi | 228/219 |
| 4,538,757 | 9/1985 | Bertiger | 228/37 |
| 4,921,156 | 5/1990 | Hohnerlein | 228/42 |
| 5,044,542 | 9/1991 | Deambrosio | 228/42 |
| 5,048,746 | 9/1991 | Elliott et al. | 228/37 |
| 5,121,874 | 6/1992 | Deambrosio | 228/37 |

FOREIGN PATENT DOCUMENTS 9107248 5/1991 World Int. Prop. O. .
9108855 6/1991 World Int. Prop. O. .

*Primary Examiner*—Paula A. Bradley
*Assistant Examiner*—Chuck Y. Mah
*Attorney, Agent, or Firm*—Wegner, Cantor, Mueller & Player

[57] ABSTRACT

The invention relates to a wave soldering device in which solder is pumped up from a solder bath and through a tower and issues therefrom in the form of a wave which engages the underside of a circuit board, flows over a front and/or rear weir of the tower and returns to the solder bath. A conveyor transports circuit boards across the top of the tower and the solder wave. A confining structure is situated adjacent the wave and protrudes into the solder bath. A gas which substantially excludes oxygen is injected from a nozzle and follows a circuitous route bordered by solder in the bath, solder flowing over the rear weir, and walls of the confining structure. The gas exiting from an outflow opening of the confining structure is directed across the solder flowing over the rear weir and onto the downstream line of contact of the solder wave and the board as it leaves the solder wave. Thus, this supply of gas is directed only onto the immediate area where it is most useful, so as to limit dispersal away from this immediate area and minimize the amount of gas required. In a preferred embodiment, secondary means are arranged to supply the gas to other areas of an enclosure for the conveyor and solder tower.

20 Claims, 2 Drawing Sheets

SOLDERING DEVICE WITH SHIELD OF GAS SUBSTANTIALLY EXCLUDING OXYGEN

BACKGROUND AND SUMMARY OF THE INVENTION

The invention relates to a soldering device comprising: a solder tower; transporting means for carrying the objects for soldering along the upper part of the solder tower; means for causing a solder wave to emerge from the solder tower, which wave comes into contact with the underside of the objects for soldering.

Such soldering machines are generally known.

Such known soldering machines suffer from the drawback that through the presence of air, and in particular the presence of oxygen in the air, the solder wave oxidizes at a temperature of about 250°, whereby more flux is required to remove oxides, as otherwise the quality of the obtained solder joint leaves something to be desired. Due to rapid oxidation the solder circulating inside the soldering devices is also contaminated.

To avoid this problem it is generally known to perform soldering operations in an environment substantially excluding oxygen, that is, in an environment in which mainly a protective gas is present. In order to keep this protective gas in place complicated devices are usually necessary. The object of the present invention is to provide a soldering device wherein with simple means an atmosphere of protective gas is maintained only at the places where this is necessary.

This object is achieved in that the device comprises feed means for supplying protective gas to the direct vicinity of the solder wave.

It thus becomes possible with relatively simple means to create an atmosphere substantially excluding oxygen at the places where this is necessary, namely at the place where the solder joint is being formed.

According to a preferred embodiment the feed means are adapted to supply gas substantially excluding oxygen to the side of the solder wave located downstream of the direction of movement of the objects for soldering.

The protective gas is hereby supplied to the place where the presence of oxygen is the most critical.

BRIEF DESCRIPTION OF THE DRAWINGS

The present invention will subsequently be elucidated with reference to the following embodiments, wherein.

DETAILED DESCRIPTION OF THE INVENTION

Figure 1:
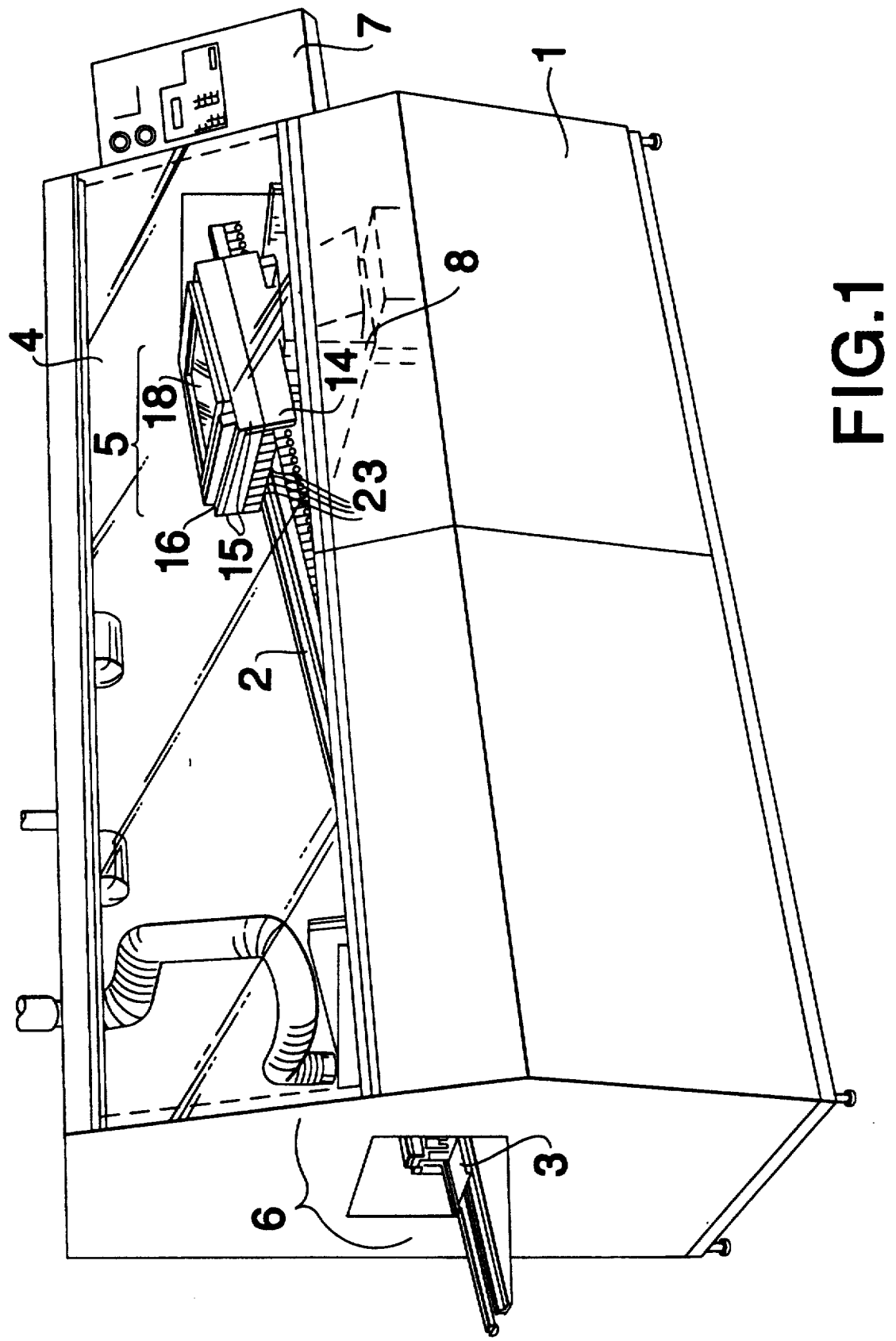
FIG. 1 shows a perspective view of a soldering machine in which the device according to the present invention is applied.

The soldering machine shown in FIG. 1 is placed in a housing 1 inside which is arranged a conveyor belt 2 along which the printed circuit boards 3 for soldering are moved forward. The conveyor belt is formed in the present embodiment by a so-called finger conveyor belt, but this is not essential; it is possible to employ other types of transporting means. Arranged in housing 1 is a window 4 through which the conveyor belt 2 is visible. The conveyor belt is further guided through a soldering device 5. Further forming part of the soldering machine are a flux device 6 located upstream and a pre-drying device (not shown in the drawing), which otherwise do not form subject-matter of the present invention and will not be further discussed here. A control panel 7 is fixed to the housing 1.

Figure 2:
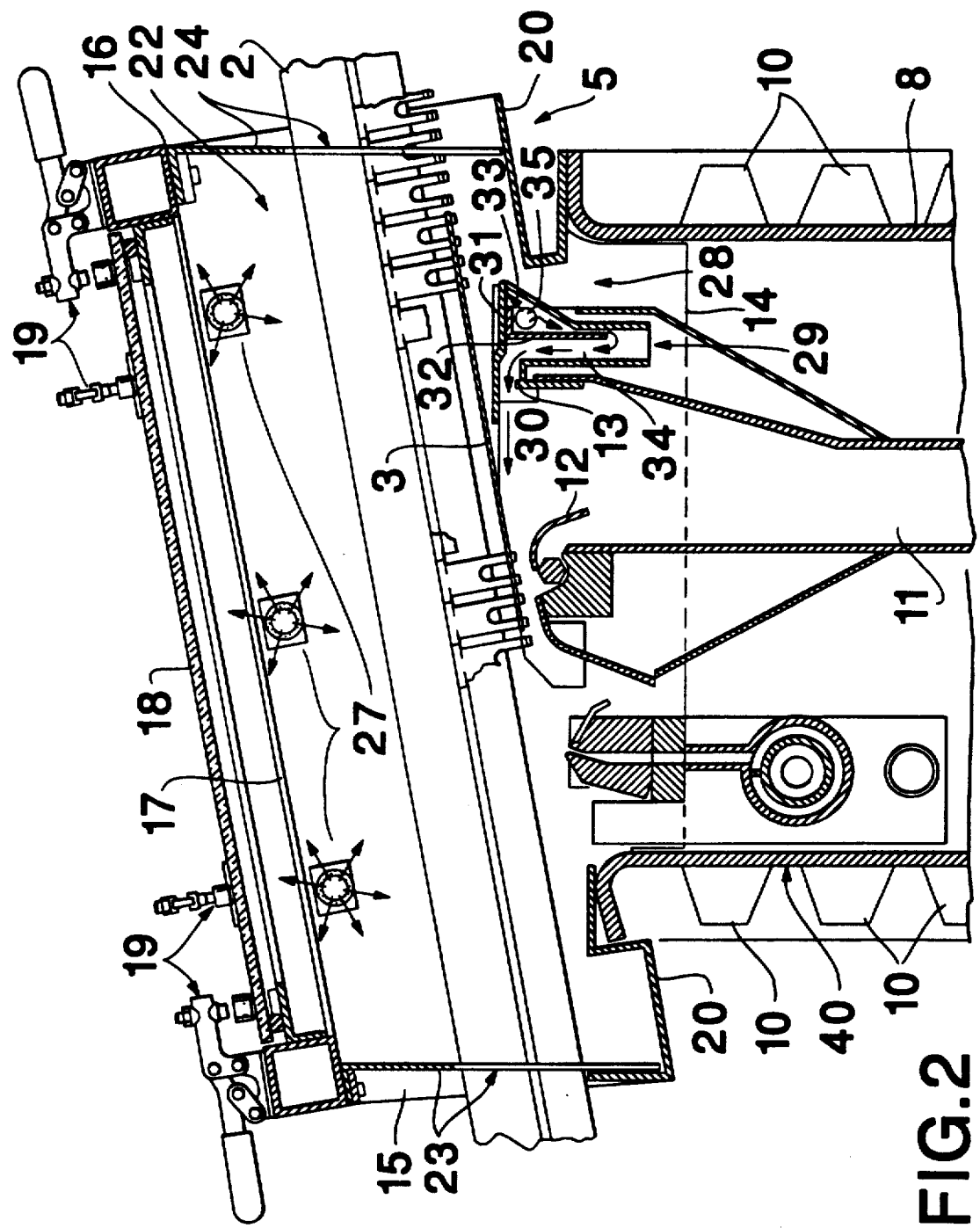
FIG. 2 shows a sectional view of the soldering device according to the present invention which is accommodated in the soldering machine depicted in FIG. 1.

The soldering device 5 is shown in detail in FIG. 2. The soldering device 5 is formed by a pot 8 inside which is placed liquid solder. The solder is heated by a heating device 10 present on the side of the pot so that it becomes and remains liquid. A solder tower 11 is arranged in the pot 8, wherein the solder present in the pot is pumped upward through the solder tower 11 by means of a pump (not shown in the drawing), wherein the solder flows downward over a front weir 12 and a rear weir 13. The conveyor belt 2 extends above the thus created solder wave so that the printed circuit boards 3 transported by the conveyor belt are soldered on their underside.

The above represents only a summary description of the soldering device, since this per se forms no part of the present invention.

As shown in FIG. 1, at the location of pot 8 two divided side plates 14, 15 are arranged above the pot on each of the sides of the conveyor belt 2. At the top both upper plates 15 are connected by a top plate 16 in which an opening 17 is arranged which can be covered by means of a removable window 18. The latter is fastened by means of fixation devices 19. The lower plates 14 are connected to the solder pot 8. This construction makes it possible to move the conveyor belt upward and then to move the solder pot sideways out of the machine.

Both lower side plates 14 are connected at their bottom by diverse underplates 20. The lower side plates 14 are further provided with the downward extending portions which, as shown in FIG. 2, extend in the normal position into the pot 8. The sides of both downward extending portions are joined by plates (not shown) which likewise extend into the pot. A tunnel 22 is thus formed which is entirely closed on both sides and at the top and bottom.

The front and rear sides of the tunnel are closed off as far as possible by flexible strips or flaps 23, 24 which enable the entry and exit respectively of printed circuit boards for soldering and soldered boards. It is thus possible to create a space that is closed off as much as possible, in which the soldering process can be performed while a protective gas is supplied.

The feed device for supplying protective gas is integrated into the tower. The feed device is formed by an elongatedly formed box 28, having the general shape of an inverted L as viewed in cross-section in FIG. 2, arranged on the outflow side of the tower 11. The box 28 is provided on its underside with an opening 29 and provided at the top with an outflow opening 30 on one side for channeling substantially all of the gas to flow directly across the exposed, returning solder. The box is otherwise wholly closed. The box is provided with a stepped upper part 31.

Arranged from the top is a downward extending middle wall 32. The latter divides the box into a compartment with a substantially triangular section 33 and a compartment 34 with a substantially rectangular section. Arranged in the compartment 33 of triangular section is a feed tube 35 provided with a number of openings distributed over the whole length. In the embodiment shown the openings are arranged such that they are oriented diagonally towards the apex of the compartment of triangular section. The diameter of the tube 35 is further chosen such that between the tube 35 and the middle and outer walls, respectively, of the box there is a narrow passage through which the protective gas must pass; this results in improved distribution in the breadth of the gas substantially excluding oxygen.

The gas substantially excluding oxygen leaving this tube 35 moves downward, as shown by the arrows in the drawing, through a passage between the dividing wall 32 and the side wall of the box 28 and thus passes into the compartment 34. The gas substantially excluding oxygen will there move upward and flow out against the underside of the upper wall 31 so that it arrives at the place where the printed circuit board is separated from the solder wave. The outflowing gas substantially excluding oxygen is thus pre-heated by the box. The gas substantially excluding oxygen will of course flow out of the outlet opening 30 at the top. It will then move over the solder wave to the place where the printed circuit board is separated from the solder wave. Thus is achieved that the separation between the printed circuit board and the solder wave is wholly covered with gas substantially excluding oxygen. The occurrence of solder whiskers is in any case not inconceivable partly as a result of the fact that the printed circuit board and the solder wave have a movement component in the same direction. This is avoided to a great extent by supplying gas substantially excluding oxygen. This second embodiment otherwise has the advantage that the covering of the upper part of the solder wave with gas substantially excluding oxygen is to a great extent ensured so that oxidation is prevented.

The greater part of the solder flows over the front weir 12 counter to the direction of movement of the printed circuit boards and flows downward again, while only a small portion of the solder flows downward through the compartment 34, and then only when the solder wave is pushed up by a passing printed circuit board. The gas substantially excluding oxygen supplied to the circuit board is thus pre-heated, which has a favourable effect on the soldering process through the absence of temperature gradients.

Gas substantially excluding oxygen is fed to the environment. For this purpose three gas diffusor pipes 27 are arranged above the conveyor belt 2.

Finally, a separate chip soldering device 40, which otherwise forms no part of the invention and which will not be described further, is arranged upstream of the solder tower. It will otherwise be apparent that diverse components of the two embodiments shown can be combined or used separately.

It is important that the gas substantially excluding oxygen is supplied to the location where the printed circuit board leaves the solder wave. A high temperature prevails at this location so that the danger of oxidation is great there.

By thus locally supplying gas substantially excluding oxygen the total quantity of protective gas required is quite small; this is of importance because protective gas must be supplied continuously during the whole soldering process.

Although it is possible to employ such a device without cover, the results will improve if the cover is present in the form of a tunnel or otherwise.

I claim:

1. Soldering device comprising:
   at least one solder tower extending upwardly from a solder bath;
   transporting means for carrying objects to be soldered along an upper end of said at least one solder tower;
   means for causing a wave of solder to flow from said bath and out of said upper end of said solder tower and into contact with an underside of the objects to be soldered, said solder returning to said solder bath on a return route along at least one of a front side and back side of said tower;
   supply means for supplying gas substantially excluding oxygen to a nozzle located in a vicinity of the solder wave,
   characterized by:
   at least one confining structure being located in said vicinity of said solder tower and surrounding said nozzle such that said gas injected by said nozzle is substantially confined to a space bordered by said confining structure, said solder wave and said solder bath;
   said confining structure comprising:
   means for channeling substantially all of said gas to flow into contact with an exposed surface of said returning solder along a pathway only counter to a direction of flow of said returning solder along generally an entire length of said return route.

2. Soldering device as claimed in claim 1, characterized in that said confining structure comprises:
   means for directing said gas onto a side of the solder wave located downstream of a direction of movement of the objects for soldering.

3. Soldering device as claimed in claim 2, characterized in that said confining structure comprises:
   means for heating the gas.

4. Soldering device as claimed in claim 2, characterized in:
   an opening means for outflow of said gas from said directing means being located at an uppermost level of the solder wave and oriented such that outflowing gas has a movement component opposed to said direction of movement of the objects for soldering.

5. Soldering device as claimed in claim 1, characterized in that said confining structure comprises:
   means for heating the gas.

6. Soldering device as claimed in claim 5, characterized by secondary means for supplying gas substantially excluding oxygen to the vicinity of the solder tower.

7. Soldering device as claimed in claim 5, characterized in that it comprises:
   means for substantially enveloping the solder tower, the transporting means and said supply means for said gas.

8. Soldering device as claimed in claim 1, characterized in:
   an opening means for outflow of said gas from said confining structure being located at an uppermost level of the solder wave and oriented such that outflowing gas has a movement component opposed to said direction of movement of the objects for soldering.

9. Soldering device as claimed in claim 8, characterized in:
   said outflow opening means being oriented such that outflowing gas is oriented towards a line of intersection between said objects for soldering and the solder wave.

10. Soldering device as claimed in claim 8, characterized by secondary means for supplying gas substantially excluding oxygen to the vicinity of the solder tower.

11. Soldering device as claimed in claim 8, characterized in that it comprises:
means for substantially enveloping the solder tower, the transporting means and said supply means for said gas.

12. Soldering device as claimed in claim 1, characterized by secondary means for supplying gas substantially excluding oxygen to the vicinity of the solder tower.

13. Soldering device as claimed in claim 12, characterized in that the secondary means comprise:
a feed member for said gas being situated above the transporting means.

14. Soldering device as claimed in claim 13, characterized in that it comprises:
means for substantially enveloping the solder tower, the transporting means and said supply means for said gas.

15. Soldering device as claimed in claim 12, characterized in that it comprises:
means for substantially enveloping the solder tower, the transporting means and said supply means for said gas.

16. Soldering device as claimed in claim 1, characterized in that it comprises:
means for substantially enveloping the solder tower, the transporting means and said supply means for said gas.

17. A soldering device as in claim 1, and further comprising:
said confining structure having a shape generally of an inverted L when viewed in cross-section perpendicular to a longitudinal axis of said nozzle.

18. A soldering device as in claim 1, wherein said nozzle comprises:
a cylindrical pipe having outflow openings evenly distributed along a length thereof.

19. The soldering device as in claim 1, and said channeling means comprising:
means for directing substantially all of said gas to flow initially toward a surface portion of said solder bath into which said returning solder wave flows; and
means for redirecting substantially all of said gas to flow away from said surface portion and into said contact with said exposed surface along said return route and along a top surface of said wave and into contact with said objects to be soldered at a line of contact between said solder wave and a circuit board on which said objects are mounted.

20. The soldering device as in claim 1, wherein said tower has a weir over which said solder flows in order to begin said return route, and said confining structure further comprising:
an outlet for said gas at a beginning of said return route; and
an upper directing means, extending generally horizontally past said weir and above at least a portion of a top of said wave, for generally confining and directing flow of said gas across said top of said wave.

* * * * *